350-432 SR

OR 3,653,750

United State

Marx et al.

[15] 3,653,750

[45] Apr. 4, 1972

[54] ROTATIONALLY SYMMETRIC OPTICAL COMPONENT COMPOSED OF AT LEAST TWO LENSES

[72] Inventors: Helmut Marx, Wetzlar; Hermann Desch, Niederquembach, both of Germany

[73] Assignee: Ernst Lutz GmbH, Wetzlar, Germany

[22] Filed: Apr. 28, 1970

[21] Appl. No.: 32,588

[30] Foreign Application Priority Data

May 2, 1969 Germany ......................P 19 22 354.2

[52] U.S. Cl. ..............................350/189, 350/197, 350/213, 350/233, 350/234

[51] Int. Cl. ....................G02b 3/04, G02b 3/00, G02b 11/00

[58] Field of Search ..................350/189, 190, 191, 192, 197, 350/213, 234, 233

[56] References Cited

UNITED STATES PATENTS 2,175,518 10/1939 Djian ....................................350/234

2,651,238 9/1953 Garutso ................................350/197

FOREIGN PATENTS OR APPLICATIONS 151,058 12/1962 U.S.S.R. ................................350/234

*Primary Examiner*—David Schonberg
*Assistant Examiner*—Paul A. Sacher
*Attorney*—Otto John Munz

[57] ABSTRACT

A rotationally symmetric component and method of producing it, for optical imaging systems having a quasi-aspherical concave surface obtained as a result of cementing to a base lens a second lens, then grinding the combined lenses so that only an annular rim lens is left of the second lens, and optionally cementing thereto a third lens, and/or a fourth lens, while each time grinding and polishing the composite body to reduce the additional lenses to rim lenses, the radii and optical characteristics being of such a magnitude that the combined refractive characteristics resemble those of an aspherical surface.

7 Claims, 13 Drawing Figures

0 1 2

$r_3$ $r_0$ $r_1$ $r_2$

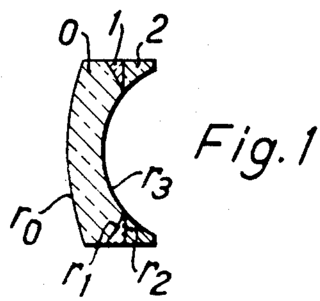
Fig. 1
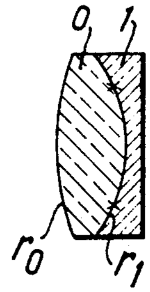
Fig. 2
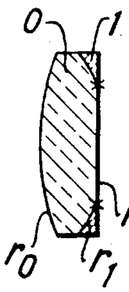
Fig. 3
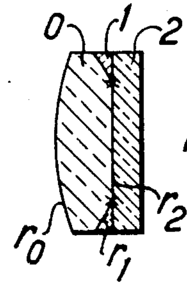
Fig. 4
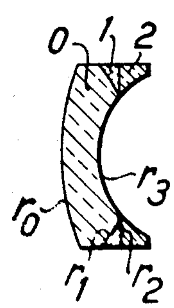
Fig. 5
Fig. 6
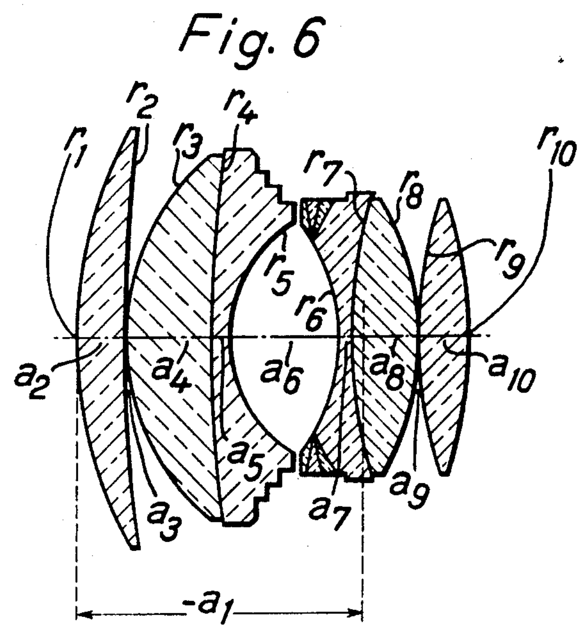
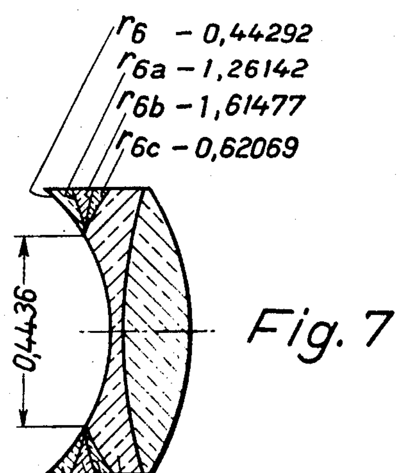
Fig. 7
INVENTORS
HELMUT MARX, HERMANN DESCH
BY
Otto John Munz
ATTORNEY

INVENTORS
HELMUT MARX, HERMANN DESCH
BY
ATTORNEY

ROTATIONALLY SYMMETRIC OPTICAL COMPONENT COMPOSED OF AT LEAST TWO LENSES

BACKGROUND OF THE INVENTION

1. Field of the Invention

The invention relates to a rotationally symmetric optical component composed of at least two lenses separated from one another by at least one optically active intermediate surface of annular shape, so as to produce a quasi-aspherical exit surface.

2. Description of the Prior Art

In the prior art a major portion of the imaging errors in optical systems is due to the fact that generally only spherical surfaces are used as optically active surfaces for both refraction and reflection. The reason for this is the simplicity with which spherical surfaces can be produced mechanically with the requisite optical precision.

Various suggestions have been made in the past for the production of optically active surfaces which deviate from spherical surfaces, but the machines required for such purposes are suitable only for convex surfaces, are extremely complex and costly, and moreover the precision necessary for aspherical surfaces for imaging systems has not been available. No case of a successful production of an aspherical concave surface of an imaging system is known.

In order to circumvent the above-mentioned difficulties, it has been suggested to use, in addition to a conventional lens with spherical surfaces, either an annular lens also with spherical surfaces which acts only on the marginal rays, or to add to the conventional lens with spherical surfaces lenses of smaller active diameter which likewise have only spherical surfaces and which act on the central portion of a beam area. Furthermore, it is known from the field of spectacle optics that so-called two-power or multiple-power lenses can be produced by inserting a second lens into the body of the main spectacle lens, in order to obtain different foci of the overall system for a given range. It is obvious that with the first-mentioned systems, those having additional annular lenses for example, there will be considerable jumps in focus at the transition points. With the spectacle systems mentioned, even a specific purpose of the two-power lenses is to obtain different foci for the different range portions. These known systems are therefore not suitable for use in high-quality imaging optical systems.

This prior art is discussed in more detail in the following patents and publications: U.S. Pat. No. 2,546,996 issued Apr. 3, 1951 to S. E. Garutso; U.S. Pat. No. 2,550,685 issued May 1, 1951 to S. E. Garutso; British Pat. No. 335,696 accepted Oct. 2, 1930 to H. D. Beach; German Pat. No. 373,755; and the book "Das Brillenglas als optisches Instrument" (The spectacle Lens as an Optical Instrument) by von Rohr and Boegehold, especially pp. 85–86.

SUMMARY OF THE INVENTION

It is an object of the present invention to produce a rotationally symmetric optical component having a quasi-aspherical surface with an optical value and action comparable to the prior art components with aspherical surfaces, the production of optical components with the quasi-aspherical concave surfaces being hereby made possible for the first time.

Another object of the invention is the creation of a rotationally symmetric optical component composed of at least two, but preferably three or four lenses, separated from one another by one, two or three optically active surfaces respectively, and whereby at least one of the intermediate surfaces occupies only an exterior annular portion of the total optically active surface, the indices of refraction of the various glasses and the radii of the intermediate surfaces being of such magnitude that only a small jump in the beam deflection, such as is tolerable for instance for photographic purposes, occurs at the inner edge of the aforementioned exterior annular intermediate surface. In the case of more than one intermediate surface, the additional surface or surfaces may have the shape of either an annular surface in rotationally symmetric relation to the optical axis of the component or a circular surface in rotationally symmetric relation to the optical axis, the circular surface being defined by a circle lying between the optical axis and the edge of the component.

The optically active intermediate surfaces may be cemented surfaces, or may have a narrow air gap between the adjacent surfaces. It is preferable that the optically active surfaces are spherical surfaces. The term spherical surfaces includes plane surfaces, which are the surfaces of a sphere of very large to infinite radius.

Particularly advantageous results are obtained with optical components having three or four lenses cemented together, with the cemented surfaces being two or three spherical surfaces respectively forming annular surfaces in rotationally symmetric relation to the optical axis of the component.

According to the invention, the production of such components, when consisting of two lenses, requires the following operative steps:

a. a first intermediate surface is ground and polished on the first lens;
b. a second lens with a matching surface is cemented to the first lens; and
c. the exit surface of the component is ground and polished on the combined lenses so that only an annular portion of the cemented surface remains.

According to the invention, an optical component having three or more lenses, requires the following operative steps for its production:

a. a first intermediate surface is ground and polished on a first lens;
b. a second lens with a matching surface is cemented to the intermediate surface of the first lens;
c. a second intermediate surface is ground and polished on the combined lenses;
d. to the second intermediate surface is cemented a third lens having a matching surface;
e. additional intermediate surfaces are ground and polished and additional lenses are cemented to the group, if the component is to consist of more than three lenses; and
f. the exit surface is ground and polished on the combined plural-lens body.

BRIEF DESCRIPTION OF THE DRAWINGS

In the accompanying drawing is illustrated, by way of an example, an embodiment of the invention, represented in the various figures as follows:

FIG. 1 shows an optical component having three lenses;

FIGS. 2 through 5 illustrate successive operative steps in the production of the optical component of FIG. 1;

FIG. 6 shows a complete optical system for photographic purposes wherein an optical component is used, which is composed of four lenses in accordance with the invention.

FIG. 7 shows, in a separate view, the optical component of the invention as used in FIG. 6.

DESCRIPTION OF THE PREFERRED EMBODIMENTS

Figure 8:
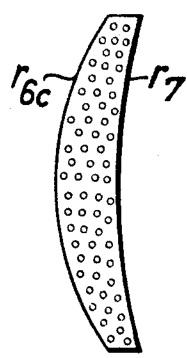
FIGS. 8 through 12 illustrate successive operative steps in the production of the optical component of FIG. 7.
Figure 9:
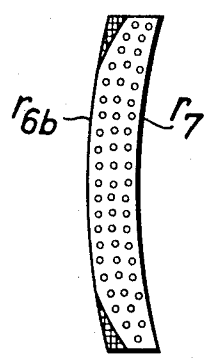
Figure 10:
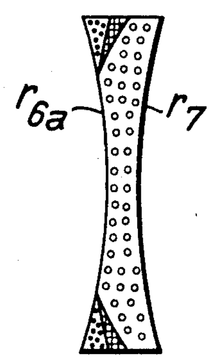
Figure 11:
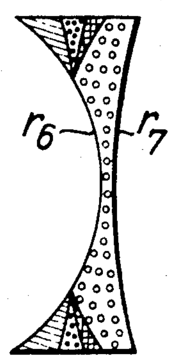
Figure 12:
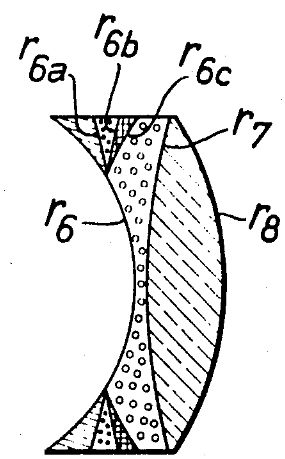

In FIG. 1 is illustrated an example of an optical component having three lenses. This component consists of a lens 0 having a front-side radius of curvature $r_o$, a rear-side radius of curvature $r_3$ in its central portion, and an oppositely curving radius of curvature $r1$ in its outer portion. To the lens surface defined by the radius $r_1$ is cemented a lens 1 which has the shape of a lens of which only the rim remains. This type of lens is therefore referred to as a rim lens. The rim lens 1 has a second surface defined by the radius $r_2$, and to this surface is cemented a second rim lens 2. The second refractive surface of the rim lens 2 has a radius of curvature $r_3$, which radius of curvature corresponds to and coincides with the radius 3 of lens 0. In this example, the two rim lenses 1 and 2 have their inner peripheral edges coinciding with one another.

In the FIGS. 2–5 is illustrated the method of producing the component shown in FIG. 1. First, the lenses 0 and 1 are ground and polished to obtain, on the former, a convex spherical surface defined by the radius $r_1$, and on the latter, a concave surface of the same curvature. The two lenses are then cemented together, using a known procedure. On this composite body is ground and polished, on its right-hand side, a surface which intersects the cemented surface along a circle. The latter is indicated by two points marked "x" in FIGS. 2 and 3. The originally full lens 1 has thus been reduced to a rim lens, the second surface of this rim lens 1 having a radius of curvature $r_2$. To this surface of radius $r_2$ of the composite body is now cemented the lens 2 which has an entry surface of the same radius $r_2$. Finally, the exit surface of the optical component is ground and polished on this composite body with a radius $r_3$ and so that this surface intersects the cemented surface between the lenses 1 and 2 at the same point where it intersects the cemented surface between the lenses 0 and 1. The final exterior shape of the optical component thus obtained is that of a meniscus lens having spherical entry and exit surfaces.

As mentioned earlier, narrow air gaps may take the place of the cemented surfaces. It is likewise possible to use other assembly methods known in the manufacture of optical components, including, for example, the wringing-on or the welding-on of rim lenses.

Figure 13:
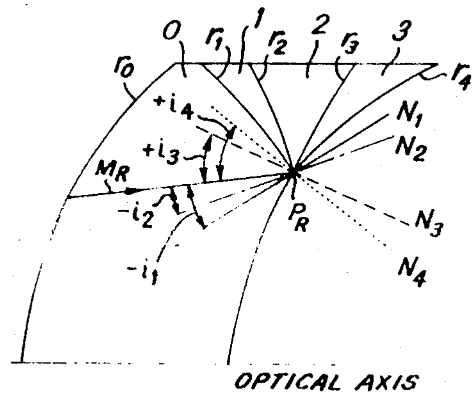
FIG. 13 is a Figure illustrating certain angles in the lens of FIG. 11, for example.

In the following will be explained the optical characteristics of a component composed of four lenses, as illustrated in FIG. 13. This component is comparable to the one shown in FIG. 1, except that instead of two additional rim lenses it uses three such rim lenses. The component consists of a lens 0 defined by a front radium $r_0$ and a rear radius $r_4$, a first rim lens 1 cemented to the rear side of the lens 0 and defined by the radii $r_1$ and $r_2$, a second rim lens cemented to the rim lens 1 and defined by the radii $r_2$ and $r_3$, and finally, a third rim lens 3 cemented to the latter and defined by the radii $r_3$ and $r_4$. All three rim lenses have the same inner peripheral edge at $R$.

The rim lens 1, with the radii $r_1$, and $r_2$, has a refractive index of $n_1 = n_2$, its percentage deviation $\epsilon'_1 = \epsilon_2$ from the refractive index $n$ of the base lens 0 amounting to $100(n'_1-n)/n$. Similarly, the percentage deviation $\epsilon'_2 = \epsilon_3$ of the refractive index of the rim lens 2 from the refractive index of the base lens 0 is $100(n'_2-n)/n$, and the percentage deviation $\epsilon'_3 = \epsilon_4$ of the refractive index of the rim lens 4 from the refractive index of the base lens 0 accordingly is $100(n'_3-n)/n$. In the example given the component is to be part of a photographic objective. A meridian ray $M_R$ originating in the center of the object plane and reaching the point $P_R$ on the edge circle $R$ forms (plus-sign or minus-sign) angles $i_1$, $i_2$, $i_3$, and $i_4$ with lines $N_1$, $N_2$, $N_3$, and $N_4$, each of which passes through point $P_R$, and which are respectively normal to the surfaces between lenses 0 and 1, between lenses 1 and 2, between lenses 2 and 3, and between lens 3 and the outer or exit surface. The angles $i_1$, $i_2$, $i_3$ and $i_4$ could be referred to as a general angle $i_\alpha$, where $\alpha$ varies from 1 to 4. It can then be said (with $\epsilon_1=0$ and $\epsilon'_4=0$) that, with good approximation: First: An infinitesimal or small value of $$\sum_{\alpha=1}^{4} (\epsilon'_\alpha - \epsilon_\alpha) \tan i_\alpha \equiv \sum T^{(1)} \quad (1)$$

guarantees that the curve of the spherical aberration in the image (lateral aberration) at the ray $M_R$ has no jump or only a small one;

Second: An infinitesimal or small value of $$\sum_{\alpha=1}^{4} (\epsilon'_\alpha - \epsilon_\alpha) \tan^2 i_\alpha \equiv \sum T^{(2)} \quad (2)$$

guarantees that the aberration curve of the coma in the vicinity of the image center (lateral aberration) has no different jump, or only a slightly differing jump, from the curve of spherical spherical aberration.

Third: The value of $$\sum_{\alpha=1}^{4} (\epsilon'_\alpha - \epsilon_\alpha) \tan^3 i_\alpha \equiv \sum T^{(3)} \quad (3)$$

is a measure of the kink in the curve of the spherical aberration in the image (lateral aberration) at the ray $M_R$, and thus a measure of the quasi-aspherical action of the component with the cemented rim lenses.

In the example of the component consisting of four lenses, these sums run from $\alpha=1$ to $\alpha=4$; for a component consisting of a number of lenses equal to $A$, the above expressions under the first, second, and third statements are valid for the corresponding sums over the range from $\alpha=1$ to $\alpha=A$.

In an example of a component composed of four lenses, the percentage deviation of the refractive index of the rim lenses was chosen to be $$\epsilon'_1=3.6;\ \epsilon'_2=-7.2;\ \epsilon'_3=3.6;$$

and the radii $r_1$, $r_2$, $r_3$, and $r_4$ of the rim lenses were selected so as to obtain:

$\tan i_1=-1.0675$; $\tan i_2=-0.5905$;
$\tan i_3=-0.1143$; $\tan i_4=0.3623$.

The above expressions (1), (2), and (3) then give the values listed in the table below:

| No | $T^{(0)}$ | $T^{(1)}$ | $T^{(2)}$ | $T^{(3)}$ |
|---|---|---|---|---|
| 1 | 3.6 | −3.843 | 4.102 | −4.379 |
| 2 | −10.8 | 6.383 | −3.771 | 2.228 |
| 3 | 10.8 | −1.235 | 0.141 | −0.016 |
| 4 | −3.6 | −1.304 | −0.473 | −0.171 |
| Σ | 0 | 0.001 | −0.001 | −2.338 |

from which it can be seen that:

$$\sum T^{(1)} \approx 0;\ \sum T^{(2)} \approx 0;\ \sum T^{(3)} \approx -2.3.$$

In the following will be described an example of a complete optical system, wherein a component embodying the present invention is used, the system being a photographic objective having a focal length of 52 mm, a field angle of 2°×22.5° and a relative aperture of 1:1.0. Such a system is illustrated in FIG. 6, which shows a six-lens objective of the Gauss-type with cemented inner members, the system having refractive surfaces No. 1 through No. 10 along its optical axis, its two end surfaces (No. 1 and No. 10) being aspherical. The concave surface No. 6 of the system includes three cemented rim lenses. Thus, the negative portion of the meniscus lens behind the shutter of this Gauss-type objective represents a component composed of four lenses in accordance with the present invention. In FIG. 7 are listed the design data of this component, the cementing surfaces of the three cemented rim lenses being designated by *6a*, *6b*, and *6c*. The remaining design data and characteristics of the photographic objective of FIG. 6 are covered by the claims 1 to 3 of the German Pat. application No. P 14 47 227.6, filed Apr. 25, 1964, which corresponds to U.S. Pat. No. 3,459,468 of Aug. 4, 1969. They are listed in the table below, the dimensions being reduced to focal length 1:

| No | $a$ | r | $n'_e$ | $\nu'_a$ |
|---|---|---|---|---|
| 1 | −0.7503 | 1.1506 | 1.8206 | 45.0 |
| 2 | 0.1296 | 4.5718 | 1.0 | |

| | | | | |
|---|---|---|---|---|
| 3 | 0.0006 | 0.5664 | 1.9006 | 40.4 |
| 4 | 0.2242 | 2.3972 | 1.7918 | 25.9 |
| 5 | 0.0412 | 0.3442 | 1.0 | |
| 6 | 0.2860 | −0.4429 | 1.8427 | 30.0 |
| 7 | 0.0306 | 1.3631 | 1.9006 | 40.4 |
| 8 | 0.1785 | −0.6550 | 1.0 | |
| 9 | 0.0006 | 1.1652 | 1.6940 | 54.5 |
| 10 | 0.1308 | −1.0536 | 1.0 | |

The distance $a_1$ found in the above table designates the distance from the vertex of the surface No. 1 to the entry pupil.

The vertex curvature of the aspherical surface No. 1 is: $(1/r_1) = c_1^{(1)}$; and the vertex curvature of the aspherical surface No. 10 is: $(1/r_{10}) = c_{10}^{(1)}$.

The aspherical surfaces No. 1 and No. 10 obtained after reducing the objective to focal length 1 are defined in the following by the coefficients $c^{(i)}$, which latter are obtained, when the arc height $c$ is developed with the powers of $b = (½) L^2$, where $L$ is the length of the chord, $L \equiv \sqrt{y^2+c^2}$, representing the distance from the surface vertex to the point considered on the aspherical surface, $y$ being the elevation, and $c$ the arc height of this point. The development of $c$ defining the aspherical surface is as follows:

$$c = c^{(1)}b + c^{(2)}b^2 + c^{(3)}b^3 + c^{(4)}b^4 + c^{(5)}b^5 + c^{(6)}b^6.$$

The coefficients $c^{(1)}$ to $c^{(6)}$ of the two aspherical surfaces No. 1 and No. 10 have these values:

| No. | $c^{(1)}$ | $c^{(2)}$ | $c^{(3)}$ | $c^{(4)}$ | $c^{(5)}$ | $c^{(6)}$ |
|---|---|---|---|---|---|---|
| 1 | 0.869094 | −0.188039 | 0.2 | 0 | −16.0 | 100.0 |
| 10 | −0.949170 | 1.889268 | −11.34 | −2.5 | −4.0 | 4,000.0 |

In this photographic objective the percentage deviations of the refracting indices of the rim lenses are $\epsilon'_6 = \epsilon_{6a} = 3.120$; $\epsilon'_{6a} = \epsilon_{6b} = -7.535$; $\epsilon'_{6b} = \epsilon_{6c} = 4.698$, and the meridian ray $M_R$ originating from the object center and passing through the base lens immediately below an upper point $P_R$ on the inner edge $R$ of the rim lens forms the angles $i_6$, $i_{6a}$, $i_{6b}$, and $i_{6c}$ with another line through $P_R$ which is normal to the surfaces 6, 6*a*, 6*b*, and 6*c*. The tangent values of these angles are:

$\tan i_6 = -0.3688$; $\tan i_{6a} = 0.0126$;
$\tan i_{6b} = 0.3554$; $\tan i_{6c} = 0.6554$.

Applying the earlier-mentioned expressions from the first, second, and third statements to this case, the sums from expressions (1), (2), and (3) over $\alpha = 6$, $6a$, $6b$, and $6c$ (while $\epsilon_6 = 0$ and $\epsilon'_{6c} = 0$) give the values listed in the table below:

| No | $T^{(0)}$ | $T^{(1)}$ | $T^{(2)}$ | $T^{(3)}$ |
|---|---|---|---|---|
| 6 | 3.120 | −1.151 | 0.425 | −0.157 |
| 6*a* | −10.655 | −0.134 | −0.002 | −0.000 |
| 6*b* | 12.233 | 4.347 | 1.545 | 0.549 |
| 6*c* | −4.698 | −3.079 | −2.018 | −1.323 |
| Σ | 0 | −0.017 | −0.050 | −0.931 |

As can be seen from this table, the sums $\Sigma T^{(1)}$ and $\Sigma T^{(2)}$ have corrected values—i.e. small values in comparison to the surface portion—for this objective, which was thus corrected through trigonometric computation.

Details of production of this component with three cemented rim lenses, which is shown separately in FIG. 7 and incorporated in the objective of FIG. 6, are given in the sequence of FIGS. 8 through 12. The operative steps are similar to those applying to the sequence of FIGS. 2 through 5. As shown in FIG. 6, this optical component has three corrective lenses cemented to its base lens, its optical data being as follows:

$r_6 = -0.44292$ $r_{6a} = -1.26142$ $n_{6a} = 1.90020$ $\nu_{6a} = 40.31$
$r_{6b} = 1.61477$ $n_{6b} = 1.70386$ $\nu_{6b} = 34.79$
$r_{6c} = 0.62069$ $n_{6c} = 1.92927$ $\nu_{6c} = 21.09$
$n = 1.84270$ $\nu = 29.99$ and the inner diameter of the corrective lens being 0.4436.

We claim:

1. An optical component for use in a system for optical imaging of a beam, comprising in combination:

A. a base lens having an optical axis, and

B. an annular corrective lens adjacent to the base lens, arranged in rotational symmetry relative to the optical axis, and forming an intermediate surface with the base lens, said intermediate surface being rotationally symmetric relative to the optical axis and being an annular section of a spherical surface having a radius, and said corrective lens and said base lens also jointly forming a spherical outer surface, the annular lens forming that part of the outer surface more distant from the optical axis and the base lens forming that part of the outer surface closer to the optical axis, the refractive indices of glasses used in the lenses and the radius of the annular section of the spherical surface being of a magnitude chosen such that only a small jump in deflection of the beam occurs at an edge of the annular section closest to the optical axis.

2. A component according to claim 1 wherein said base lens and said annular corrective lens define a concave outer surface, said outer surface being ground out of the part of said corrective lens closest to the optical axis to thereby cause the corrective lens to be annular.

3. A component according to claim 1 wherein said intermediate surface is a cemented surface.

4. A component according to claim 1 wherein said annular corrective lens comprises a plurality of rotationally symmetric annular lens components, said lens components being successively adjacent in a stack to form an additional intermediate surface between each pair of adjacent lens components, said additional intermediate surface being an annular section of a spherical surface.

5. A component according to claim 4 wherein said base lens and said annular corrective lens define a concave outer surface, said outer surface being ground out of the part of said corrective lens closest to the optical axis to thereby cause the corrective lens to be annular.

6. A component according to claim 4 wherein that edge of each annular section closest to the optical axis is substantially superimposed with each other such edge, and wherein each of those two surface sums $\Sigma T^{(1)}$ and $\Sigma T^{(2)}$ defined in the following equations (1) and (2) gives a corrected, small value, when compared to the size of the surface portions (sum-ends), the optical surfaces of said optical component being designated with consecutive numbers ranging from $\alpha = 1$ to $\alpha = A$:

$$\sum_{\alpha=1}^{A} (\epsilon'_\alpha - \epsilon_\alpha) \tan i_\alpha \equiv \sum T^{(1)}; \quad (1)$$

$$\sum_{\alpha=1}^{A} (\epsilon'_\alpha - \epsilon_\alpha) \tan^2 i_\alpha \equiv \sum T^{(2)}; \quad (2)$$

while the sum in the equation (3) following:

$$\sum_{\alpha=1}^{A} (\epsilon'_\alpha - \epsilon_\alpha) \tan^3 i_\alpha \equiv \sum T^{(3)}; \quad (3)$$

indicates the quasi-aspherical action of the component, the symbols used signifying the following:

$\alpha$ is the ordinal number of the corresponding corrective lens surface, $\epsilon'_\alpha \equiv \epsilon_{\alpha+1}$ is percentage deviation of refractive $n'_\alpha \equiv n_{\alpha+1}$ of a corrective lens surface from refractive index $n$ of the base lens where $\epsilon'_\alpha = 100\,(n'_\alpha - n)/n$, $\tan i_\alpha$ is the tangent of the angle $i_\alpha$ defined by a meridian ray passing through the base lens immediately below a point on the superimposed edge and by another line through the superimposed point which is normal to the surface corresponding to the number $\alpha$.

7. An optical imaging system in the form of a six-lens Gauss-type objective, of which the optical component as defined in claim 6 is a part, the system further comprising two aspherical surfaces and having the following optical data:

$f$=1.0,
field angle 45°,
aperture ratio 1:1.0

| Surface | $a$ | r | $n_e$ | $v_e$ |
|---|---|---|---|---|
| No. 1 | −0.7503 | 1.1506 | 1.8206 | 45.0 |
| 2 | 0.1296 | 4.5715 | 1.0 | |
| 3 | 0.0006 | 0.5664 | 1.9006 | 40.4 |
| 4 | 0.2242 | 2.3972 | 1.7918 | 25.9 |
| 5 | 0.0412 | 0.3442 | 1.0 | |
| 6 | 0.2860 | −0.4429 | 1.8427 | 30.0 |
| 7 | 0.0306 | 1.3631 | 1.9006 | 40.4 |
| 8 | 0.1785 | −0.6550 | 1.0 | |
| 9 | 0.0006 | 1.1652 | 1.6940 | 54.5 |
| 10 | 0.1308 | −1.0536 | 1.0 | |

$a_1$ referring to the distance between the surface No. 1 and the entry pupil of the objective, the surfaces No. 1 and No. 10 being aspherical and defined by the coefficients $c^{(i)}$ which are obtained through the development of the arc height $c$ with the powers of $b \equiv \frac{1}{2}L^2$, where $L$ is the length of the chord, $L \equiv \sqrt{y^2+c^2}$, representing the distance from the surface vertex to the point considered on the aspherical surface, $y$ being the elevation, and $c$ the arc height of the point, while the development of $c$ defining the aspherical surface is as follows:

$$c = c^{(1)}b + c^{(2)}b^2 + c^{(3)}b^3 + c^{(4)}b^4 + c^{(5)}b^5 + c^{(6)}b^6,$$

the coefficient $c^{(i)}$ for the surfaces No. 1 and No. 10 being listed in the following table:

| Surface | $c^{(1)}$ | $c^{(2)}$ | $c^{(3)}$ | $c^{(4)}$ | $c^{(5)}$ | $c^{(6)}$ |
|---|---|---|---|---|---|---|
| | 0.869094 | −0.188039 | 0.2 | 0 | −16.0 | 100.0 |
| 10 | −0.949170 | 1.889268 | −11.34 | −2.5 | −4.0 | 4,000.0 |

the surface No. 6 representing a concave, quasi-aspherical surface as part of the earlier-mentioned optical component, this optical component having three corrective lenses cemented to its base lens, its optical data being as follows:

$r_6 = -0.44292$
$n_{6a} = 1.90020$ $v_{6a} = 40.31$
$r_{6a} = -1.26142$
$n_{6b} = 1.70386$ $v_{6b} = 34.79$
$r_{6b} = 1.61477$
$n_{6c} = 1.92927$ $v_{6c} = 21.09$
$r_{6c} = 0.62069$
$n = 1.84270$ $v = 29.99$ and the inner diameter of the corrective lenses being 0.4436.

* * * * *